United States Patent
Ito et al.

[11] Patent Number: 5,937,708
[45] Date of Patent: Aug. 17, 1999

[54] CERAMIC-METAL COMPOSITE ASSEMBLY

[75] Inventors: Masaya Ito; Seiji Mori; Takaya Yoshikawa, all of Aichi Prefecture, Japan

[73] Assignee: NGK Spark Plug Co., Ltd., Aichi, Japan

[21] Appl. No.: 08/192,270

[22] Filed: Feb. 7, 1994

Related U.S. Application Data

[62] Division of application No. 07/987,186, Dec. 8, 1992.

[30] Foreign Application Priority Data

Dec. 9, 1991 [JP] Japan ................................... 3-324775

[51] Int. Cl.⁶ ............................... G05G 1/00; F16C 3/00
[52] U.S. Cl. .................... 74/572; 464/181; 415/216.1; 403/30; 416/241 B; 416/244 A
[58] Field of Search .................. 74/572, 574; 415/217.1, 415/216.1

[56] References Cited

U.S. PATENT DOCUMENTS

| | | | |
|---|---|---|---|
| 3,801,226 | 4/1974 | Bevan et al. | 415/217.1 |
| 3,943,703 | 3/1976 | Kronogard | 415/217.1 |
| 4,176,519 | 12/1979 | Kronogard | 415/217.1 |
| 4,557,704 | 12/1985 | Ito et al. | 415/216.1 |
| 4,639,194 | 1/1987 | Bell et al. | 415/216.1 |
| 4,784,574 | 11/1988 | Tsuno et al. | 415/216.1 |
| 4,850,803 | 7/1989 | Kawasaki et al. | 415/217.1 X |
| 4,915,589 | 4/1990 | Gessler et al. | 415/217.1 |
| 5,073,085 | 12/1991 | Ito et al. | 415/216.1 |
| 5,129,784 | 7/1992 | Yoshikawa et al. | 415/216.1 |

FOREIGN PATENT DOCUMENTS

| | | | |
|---|---|---|---|
| 0250118 | 12/1987 | European Pat. Off. | 415/216.1 |
| 62-4528 | 1/1987 | Japan . | |
| 62-191478 | 8/1987 | Japan . | |
| 63-22225 | 1/1988 | Japan . | |
| 2-149477 | 6/1990 | Japan | 415/216.1 |
| 2204821 | 11/1988 | United Kingdom | 415/216.1 |

OTHER PUBLICATIONS

Handbook of Tables for Applied Engineering Science, 2nd Edition, CRC Press, 1976, p. 224.

*Primary Examiner*—Vinh T. Luong
*Attorney, Agent, or Firm*—Foley & Lardner

[57] ABSTRACT

A ceramic-metal composite assembly includes an intermediate member made of a material having a thermal expansion efficiency between those of the materials forming a ceramic member and a metallic shaft member. The intermediate member is metallurgically joined to the ceramic member whilst being mechanically joined to the metallic member to constitute a single unit.

16 Claims, 7 Drawing Sheets

CERAMIC-METAL COMPOSITE ASSEMBLY

This application is a divisional of application Ser. No. 07/987,186 filed Dec. 8, 1992.

BACKGROUND OF THE INVENTION

1. Field of the Invention

The present invention relates to a ceramic-metal composite unit or assembly such as a ceramic turbocharger rotor, ceramic gas-turbine rotor, ceramic heating element, ceramic sensor, or the like which is used at a high temperature.

2. Disclosure Information

In recent years, ceramics have increasingly been used in various fields by the excellence of heat resistance, strength against thermal shock, mechanical strength at a high temperature, wear resistance, insulation, etc. However, the ceramics are not used alone but together with other materials such as metal so that they can show their excellent qualities.

An investigation has hereinbefore been made on how to unite a ceramic member and a metallic member with a view to obtaining a single unit or assembly having a high joint strength. This is because when the ceramic member and the metallic member are simply brazed together to constitute a single unit residual stresses are caused at the ceramic-metal joint portion due to the difference in thermal expansion efficiency between the ceramic material and the metallic material, thus causing decrease of the joint strength and therefore making it impossible to attain a sufficiently large joint strength.

This problem is pronounced when such a composite assembly is used at a high temperature.

To solve such a problem, it has been proposed to join a ceramic member and a metallic member by press fitting as disclosed in Japanese Patent Provisional Publication No. 62-191478.

To the same end, it has also been proposed to fit a ceramic member in a metallic member and fill the clearance between them by silver solder for thereby joining them together as disclosed in Japanese Patent Provisional Publication No. 2-149477.

In either of such prior art structures, the metallic member is made of an alloy such as Incoloy 903, having a low thermal expansion efficiency and consisting of Fe—Ni—Co alloy and precipitation hardening elements as Ti, Nb, Al, etc. However, by the use of such an alloy only, a favorable result cannot be attained. This is because there is a considerable difference in thermal expansion efficiency between the ceramic member and the metallic member, that is, the thermal expansion efficiency of Incoloy 903 used for forming the metallic member is for example 2.1 ($\times 10^{-6}/°$ C.) at 30~400° C., whilst the thermal expansion efficiency of silicon nitride used for forming the ceramic portion is 8.2 ($\times 10^{-6}/°$ C.) at 30~400° C.

As a result, when either of such prior art composite assemblies is used at a high temperature, the metallic member is expanded more than the ceramic member to make it impossible to retain a sufficient interference therebetween, thus causing a problem that the joint strength is lowered and in some case the ceramic member can be dropped off from the metallic member.

SUMMARY OF THE INVENTION

It is an object of the present invention to provide a ceramic-metal composite assembly which has a sufficiently large joint strength even when it is used at a high temperature.

It is a further object of the present invention to provide a ceramic-metal composite assembly of the above described character which has a sufficiently large interference at the ceramic-metal joint portion even when it is used at a high temperature.

It is a further object of the present invention to provide a ceramic-metal composite assembly of the above described character which is suited for adoption to a turbocharger rotor.

According to the present invention, there is provided a ceramic-metal composite assembly which comprises a ceramic member, a metallic member, and an intermediate member having a thermal expansion efficiency between those of the ceramic member and the metallic member, in which the intermediate member is chemically or metallurgically joined to the ceramic member whilst being mechanically joined to the ceramic member.

The metallurgical joining means for joining the ceramic member and the metallic member together can be brazing, diffusion joining or welding, joining by the use of oxide, friction welding, hot pressing, hot isostatic pressing, etc. More specifically, brazing by the use of an active brazing metal selected from the group of metals consisting of AG—Cu—Ti alloys, Cu—Ni—Ti alloys, Cu—Ti alloys, joining by heating by the use of a mixture of ceramic materials including $Al_2O_3$, $TiO_2$, $SiO_2$, etc. and hot pressing by interposing between the joining portions a metal selected from the group of metals consisting of Fe—Ni—Cr alloys, Ni—Cr—Si alloys, Ni—Cr alloys and Nb are more desirable for such a metallurgical joining means.

The mechanical joining means for joining the metallic member and the intermediate member together can be press fitting, shrink fitting and fastening with bolts or screws.

While the material for the metallic member can be a material of low thermal expansion efficiency such as carbon steel, alloy steel, heat resisting steel, stainless steel, Incoloy 903 or all of structural materials such as heat resisting alloys, Ni alloys, Cu alloys, it is more desirable such a material having a thermal expansion efficiency close to that of the intermediate member since the composite assembly can have a larger joint strength.

The material for the intermediate member is selected on the basis of an optional combination of a ceramic material and a metallic material which are selected from the above described materials, in such a manner that its thermal expansion efficiency is between those of the ceramic material and the metallic material. For example, it can be either a ceramic material or a metallic material such as W alloys, super hard alloys, composite material of Si3N4—TiN, Incoloy 903.

In this instance, shown in Table 1 are the thermal expansion efficiencies of the ceramic member, intermediate member and metallic member, and shown in Table 2 are desirable combinations thereof. In the meantime, those materials can be selected variously for constituting various combinations and therefore each cannot be limited to one of the ceramic member, metallic member and the intermediate member.

TABLE 1

| Sample | | | Thermal Expansion efficiency ($\times 10^{-6}/°$C.) | |
|---|---|---|---|---|
| No. | Material | Composition | 30~400° C. | 30~700° C. |
| 1 | silicon nitride | 10 wt % of $Al_2O_3$, $Y_2O_3$; the | 2.1 | 2.6 |

TABLE 1-continued

| Sample No. | Material | Composition | Thermal Expansion efficiency (×10⁻⁶/°C.) 30~400° C. | 30~700° C. |
|---|---|---|---|---|
| 2 | alumina | remainder is Si₃N₄ 5 wt % of SiO₂, CaO, MgO; the remainder is is Al₂O₃ | 7.0 | 7.7 |
| 3 | silicon nitride-TiN | 30 wt % of TiN; the remainder is Si3N4 | 2.8 | 3.8 |
| 4 | Incoloy 903 | 38 wt % of Ni, 15 wt % of Co, 0.7 wt % of Al, 1.4 wt % of Ti, 3 wt % of Nb; the remainder is Fe | 8.2 | 10.7 |
| 5 | W alloy | 5 wt % of Fe, Ni; the remainder is W | 5.1 | 5.4 |
| 6 | supper hard alloy | 10 wt % of Co; the remainder is WC | 4.8 | 5.3 |
| 7 | heat resisting steel | JIS-SUH616 | 11.9 | 12.1 |
| 8 | alloy steel | JIS-SNCM439 | 13.2 | 14.3 |

TABLE 2

| No. | Ceramic member | Intermediate member | Metallic member |
|---|---|---|---|
| A | silicon nitride | W alloy | alloy steel |
| B | silicon nitride | super hard hard alloy | heat resisting steel |
| C | silicon nitride | silicon nitride-TiN | stainless steel |
| D | silicon nitride | super hard alloy | Incoloy 903 |
| E | alumina | Incoloy 903 | stainless steel |
| D | alumina | Incoloy 903 | stainless steel |

In the meantime, since the intermediate member and the metallic member are mechanically joined together, a metallic material is more desirable for forming the intermediate member when selected from among the materials having substantially the same thermal expansion efficiency. This is because the outer surface of the intermediate member made of a metallic material can be rough to some extent in assembly and therefore an increased flexibility in assembly is attained.

Further, the difference in thermal expansion efficiency between the intermediate member and the ceramic member is desirable to be equal to or smaller than $4 \times 10^{-6}$/° C. and further desirable to be equal to or smaller than $3 \times 10^{-6}$/° C.

Further, while the method of joining the intermediate member and the ceramic member has been described as above, an intermediate member made of a soft metal such as Ni, Cu, Fe or an intermediate member made of a heat resisting soft metal such as Ni—Cu alloys may be interposed between the intermediate member and the ceramic member in accordance with the necessity.

Such a ceramic-metal composite assembly can prevent decrease of the joint strength at a high temperature since the intermediate member has a thermal expansion efficiency between those of the ceramic member and the metallic member and can decrease the thermal stresses resulting when it is used at a high temperature.

Further, since the intermediate member is metallurgically joined with ceramic member to constitute a united sub-assembly whilst the intermediate member and the metallic member are mechanically joined together by interference fit, etc., a sufficient interference in a radial direction between the intermediate member and the metallic member can be maintained even when each members are heated to expand since the difference in thermal expansion efficiency between the intermediate member and the metallic member is small. That is, a sufficient interference can be retained at the time of usage of the composite assembly at a high temperature, thus making it possible to prevent decrease of the joint strength with which the ceramic member and metallic member are joined together.

DETAILED DESCRIPTION OF THE PREFERRED EMBODIMENTS

Figure 1A:
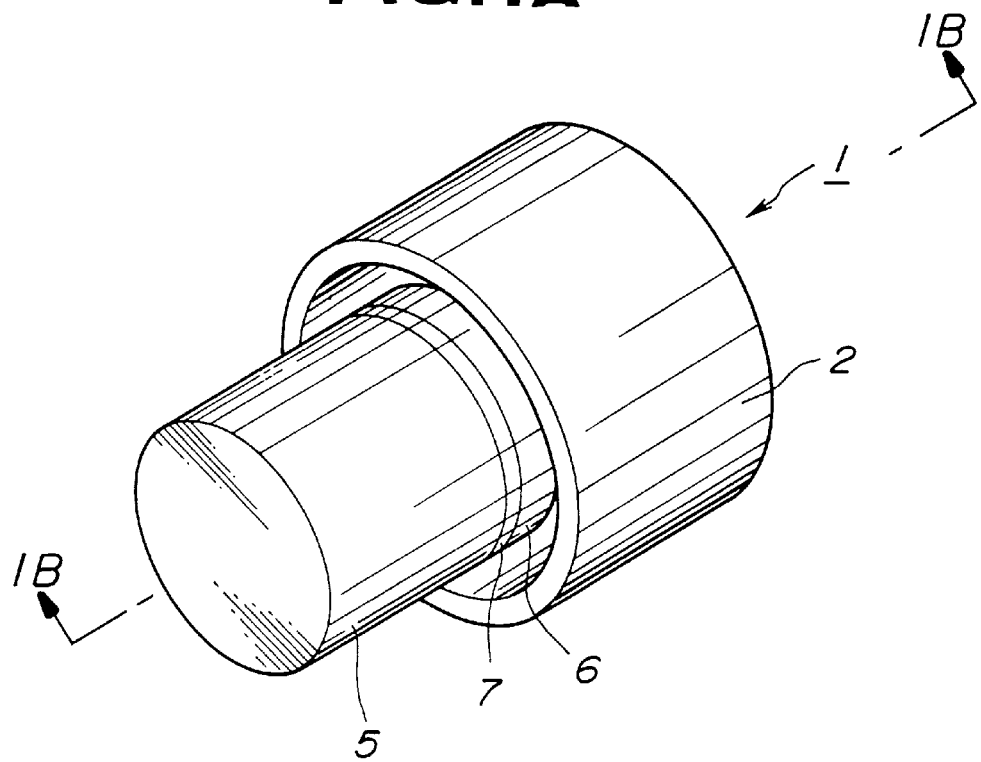
FIG. 1A is a perspective view of a ceramic-metal composite assembly according an embodiment of the present invention.
Figure 1B:
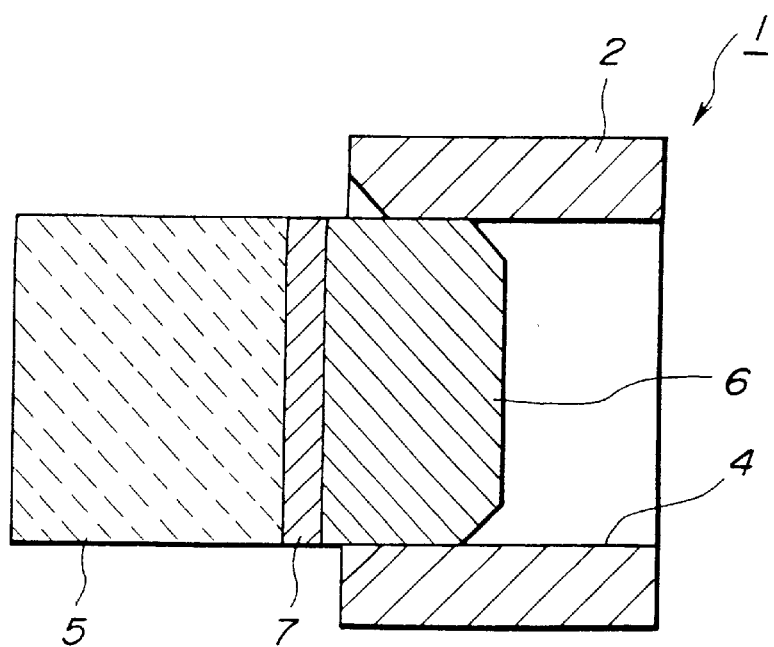
FIG. 1B is a sectional view of the composite assembly of FIG. 1A.

Referring first to FIG. 1, a ceramic-metal composite assembly according to an embodiment of the present invention mainly consists of a metallic member 2 made of heat resisting steel (e.g. JIS-SUH 616), a ceramic member 5 made of silicon nitride, and an intermediate member 6 made of Incoloy 903. The metallic member 2 is hollow cylindrical to have a bore 4. The ceramic member 5 has an outer diameter substantially equal to the diameter of the bore 4 and is integrally connected to the metallic member 2 by way of the intermediate member 6 which is fitted in the bore 4 of the ceramic member 2. The assembly 1 is provided with an intermediate layer 7 which is made of a soft metal and interposed between the ceramic member 3 and the intermediate member 6.

The ceramic member 5 and the intermediate member 6 are joined by heating, that is, joined chemically or metallurgically by way of the intermediate layer 7. On the other hand, the metallic member 2 and the intermediate member 6 are joined mechanically by press fitting the intermediate member 6 in the bore 4 of the metallic member 2. In brief, disposed between the ceramic member 5 having a smaller thermal expansion efficiency and the metallic member 2 having a larger thermal expansion efficiency is the intermediate member 6 having a thermal expansion efficiency intermediate between those of the metallic member 2 and the ceramic member 5.

In the meantime, the dimensions of each members are shown in Table 3. Of the members, the metallic member 2 is made of JIS-SUH 616 and machined after quenching and tempering according to the Japanese Industrial standards (JIS), whilst the intermediate member 6 be aged by heating at a temperature of 720° C. for 8 hours and at a temperature of 620° C. for 8 hours.

TABLE 3

| Metallic member | outer dia.: 16 mm, length: 25 mm, inner dia.: 9.94 mm (chamfering of bore end: C3.0 mm) |
|---|---|
| Ceramic member | dia.: 11 mm, length: 20 mm (chamfering at an end: C1.0) |
| Intermediate member | dia.: 11 mm, length: 5.0 mm |
| Intermediate layer | dia.: 11 mm, thickness: 0.5 mm |

The method of producing such a composite assembly 1 will be described with reference to FIGS. 2A–2C and 3A–3B in which the different scales are employed only for convenience of illustration.

Figure 2A:
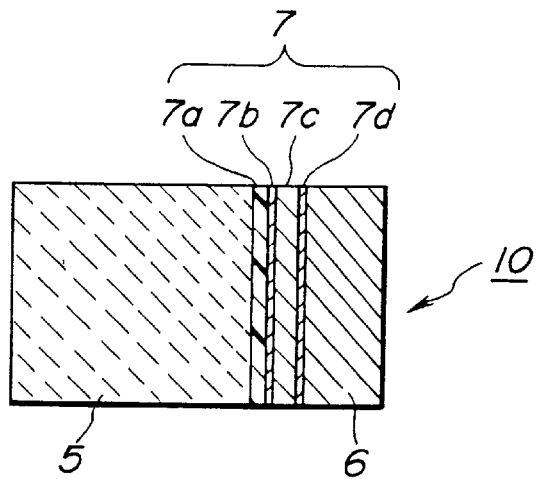
FIGS. 2A–2C and 3A–3B are views for illustrating the method of producing the composite assembly of FIG. 1.
Figure 2B:
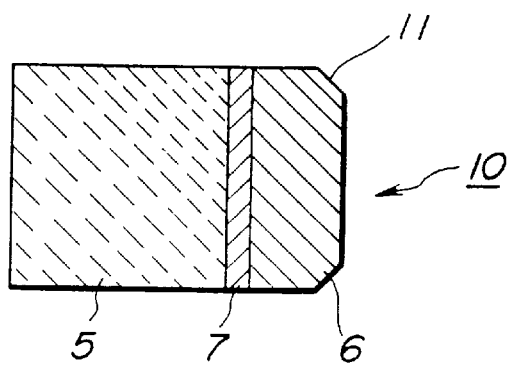
Figure 2C:
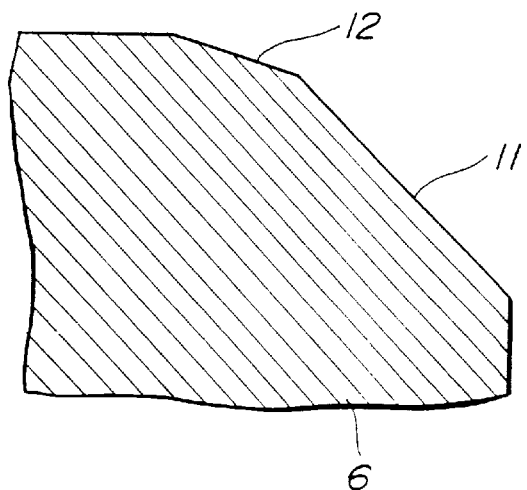

Firstly, as shown in FIG. 2A, the intermediate layer 7 is formed between the ceramic member 5 and the intermediate member 6. The intermediate layer 7 is formed by laying one upon another and in the following described order from the ceramic member 5 side a Ti foil 7a of the thickness of 0.003 mm, a Cu foil of the thickness of 0.02 mm, a Ni plate 7c of the thickness of 0.5 mm and a Cu foil 7d of the thickness of 0.02 mm.

Then, the ceramic member 5 and the intermediate member 6 with the intermediate layer 7 being constructed and arranged in the above manner therebetween are heated in the vacuum of $10^{-5}$ torr and at a temperature of 1200° C. for 1 hour, so that the ceramic member 5 and the intermediate member 6 are joined to constitute a single unit or united subassembly 10.

Then, the entire of the outer circumferential surface of the united subassembly 10 is ground by the use of a diamond grinder so that the outer diameter of the united subassembly 10 is sized to 10 mm. Further, as shown in an enlarged scale in FIGS. 2B and 2C, an end of the intermediate member 6 is machined to have a chamfer of 1 mm and a gradually slanted portion 12 slanted at an angle of 4' at a location inside of the chamfer 11.

Figure 3A:
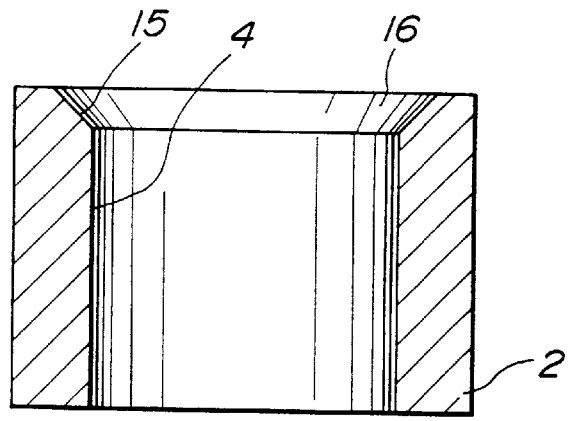

Further, as shown in FIG. 3A, the metallic member 2 which is hollow cylindrical is formed with a beveled portion 15 at an end of the bore 4 so that the beveled portion 15 constitutes a guide opening 16 for insertion of the integral unit 10 into the bore 4.

Figure 3B:
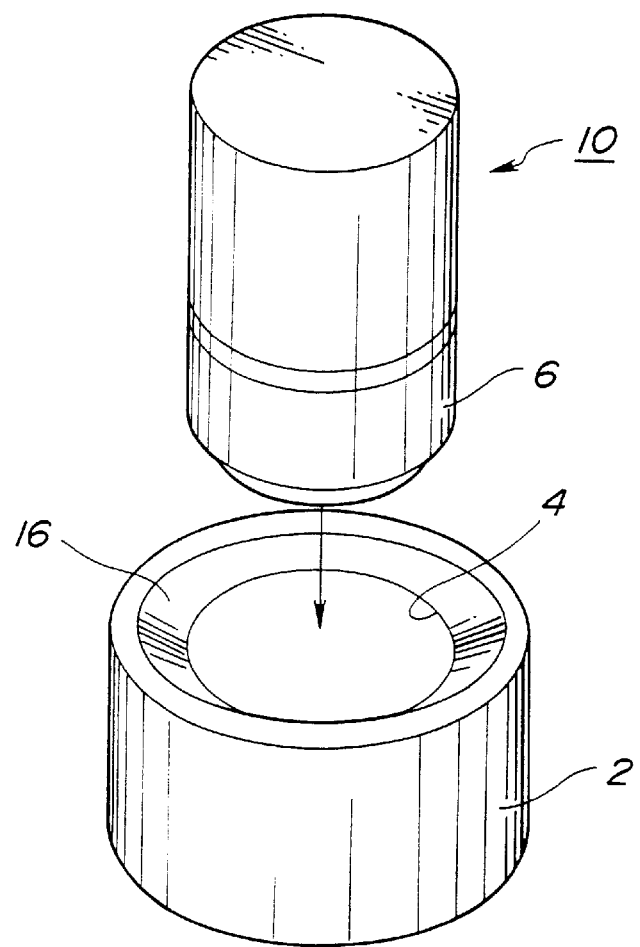

Then, as shown in FIG. 3B, the intermediate member 6 of the subassembly 10 is press fitted by 3 mm in length into the metallic member 2 through the guide opening 16 at a speed of 0.5 mm/min. to constitute the united assembly 1 shown in FIG. 1.

The united assembly 1 of this embodiment produced in this manner is small in the difference in thermal expansion efficiency between the intermediate member 6 and the metallic member 2 and therefore can retain a sufficient interference at a high temperature and therefore can attain a large joint strength. Accordingly, the assembly 10 is superior in durability to a comparable prior art assembly and has such a joint strength that is large enough to enable production of a large-sized composite assembly.

Then for assuring the effect of this embodiment description will be made to test sample.

Various test samples made of different materials were prepared and tested for a dropping-off load at a high temperature in order to examine the joint strength of the composite assembly 1 of this embodiment.

Figure 4:
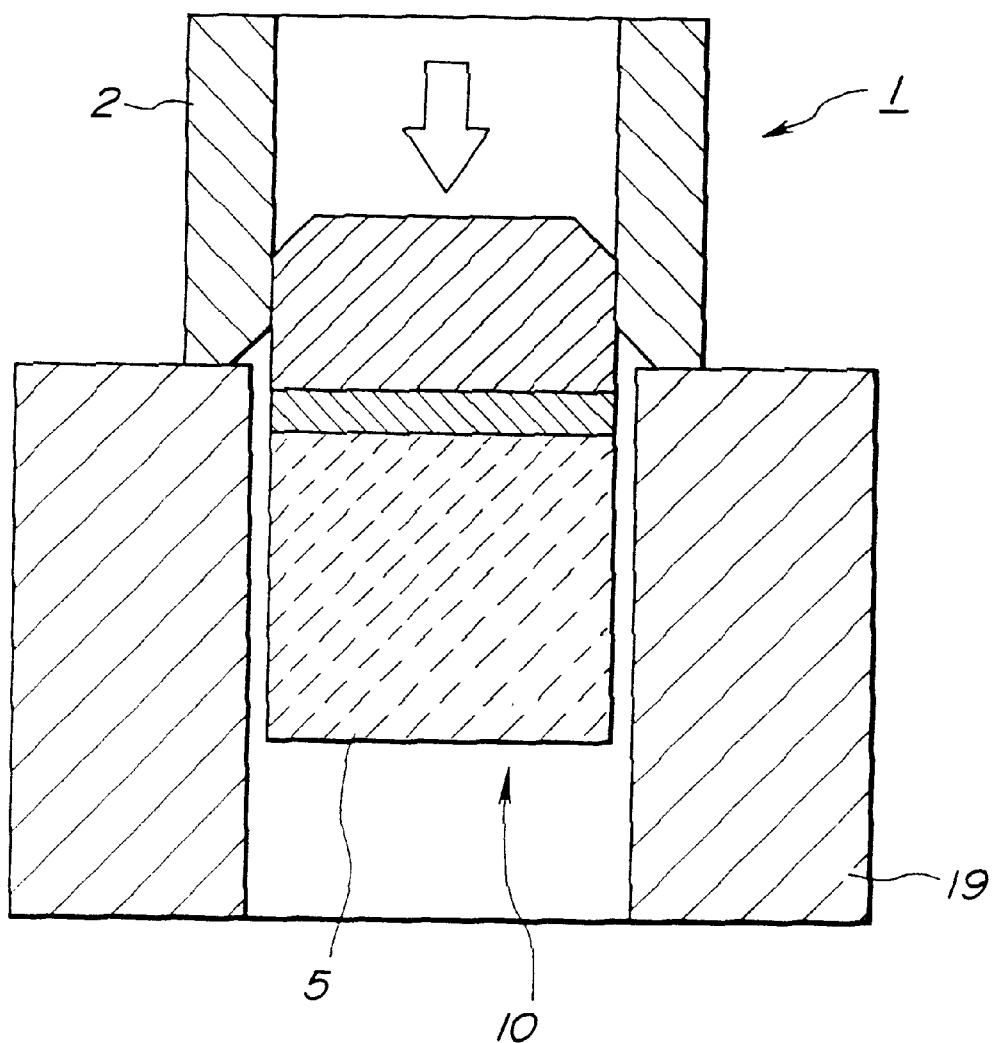
FIG. 4 is a view for illustrating the method of testing the assembly of FIG. 1.

The measurement of the dropping-off load were made by first placing, as shown in FIG. 4, the ceramic member 5 of the composite assembly 1 inside of an annular block 19 whilst allowing the metallic member 2 to abut upon the upper surface of the annular block 19, then pushing the subassembly 10 downward at a loading speed of 0.5 mm/min. and measuring the load by which the subassembly 10 were dropped off from the metallic member 2. The result of measurements is shown in Table 4.

Further, such comparative examples were prepared in which no intermediate member was used but the metallic member and the ceramic member were directly joined together by press fitting to constitute an assembly of 25 mm in length though the ceramic member and metallic member were made of the same materials with those of the above described embodiments. The result of measurement is shown in Table 4.

TABLE 4

| Test sample No. | Ceramic member | Metallic member | Intermediate member | Dropping-off load (kgw) |
|---|---|---|---|---|
| Samples of this invention | | | | |
| 1 | silicon nitride (10 wt % of $Al_2O_3$, $Y_2O_3$; the remainder is $Si_3N_4$) | W alloy | SUH616 | 300 and more |
| 2 | silicon nitride | W alloy | Incoloy 903 | 300 and more |
| 3 | silicon nitride | super hard alloy | SUH616 | 300 and more |
| 4 | silicon nitride | Si3N4-0TiN | Incoloy 903 | 240 |
| Comparative examples | | | | |
| 5 | silicon nitride | not provided | Incoloy 903 | 140 |
| 6 | silicon nitride | not provided | SUH616 | 0 |

In the above table 4, the ceramic member is made of silicon nitride consisting of 10 wt % of $Al_2O_3$, $Y_2O_3$ and the remainder of $Si_3N_4$. SUH616 is a heat resisting steel whilst being a material for quenching and tempering. Incoloy is a material for hardening by aging.

As will be apparent from Table 4, the composite assembly of this invention has a large dropping-off load of 240 Kgw and is therefore desirable since it can obtain a large joint strength at a high temperature, whilst the comparative examples have a small dropping-off load of 140 Kgw and is therefore undesirable.

Figure 5:
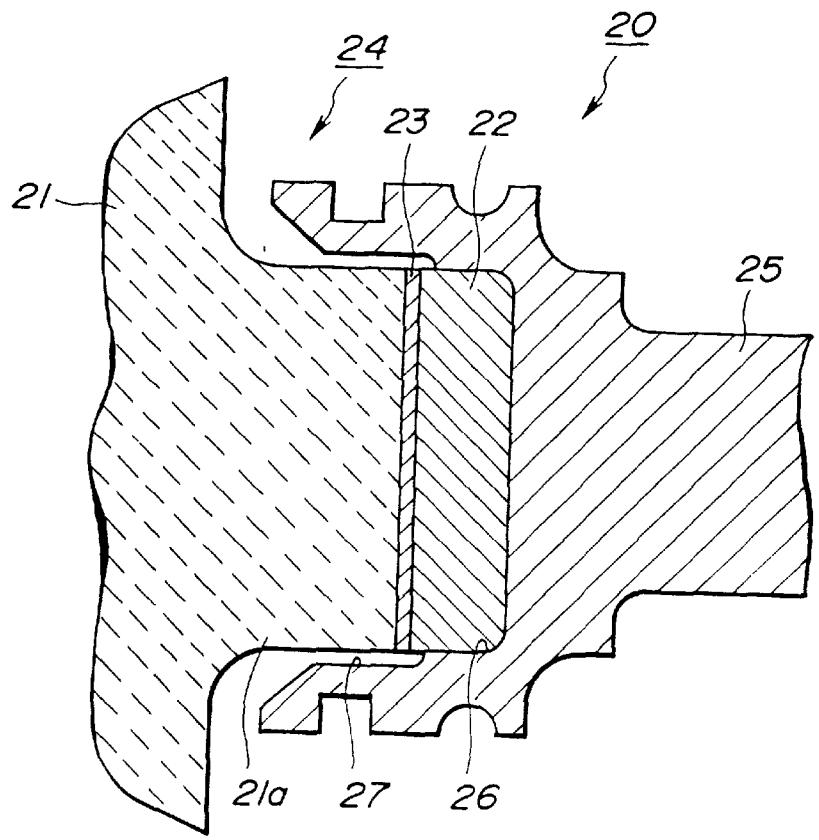
FIGS. 5 through 10 are sectional views of ceramic-metal composite assemblies according to further embodiments of the present invention.

FIG. 5 shows a ceramic-metal composite rotor 20 for a turbocharger according to a further embodiment of the present invention. The rotor 20 includes a ceramic turbine wheel 21 made of silicon nitride and having a stub shaft 21a, an intermediate member 22 made of W alloy and joined to the stub shaft 21a of the ceramic wheel 21 by way of a Ni plate 23 to constitute a united subassembly 24, and a metallic member 25 having a socket portion 26 in which the intermediate member 22 of the subassembly 24 is fitted. In the meantime, the socket portion 26 of the metallic member 25 has a wall surrounding the stub shaft 21a of the ceramic turbine wheel 21 and having an annular recess 27 so as not to directly contact the stub shaft 21a, i.e., so as to provide a space between the wall of the socket portion 26 and the stub shaft 21a.

In production of the ceramic-metal composite rotor 20, the turbine wheel 21 and the intermediate member 22 of 10 mm in diameter with a Ni plate 23 being interposed between the stub shaft 21a and the intermediate member 22 are joined by heating to constitute the subassembly 24. On the other hand, the metallic member 25 made of heat resisting steel (JIS-SUH616) is treated by a predetermined quenching and tempering process so as to be as hard as HRC 34 and is formed with the socket portion 26 of 9.94 mm in inner diameter. The intermediate member 22 of the subassembly 24 is press fitted in the socket portion 26 of the metallic member 25 to constitute the composite rotor 20.

The composite rotor 20 was installed in a turbine housing and subjected to a rotation test in which it was rotated at a speed of 100,000 rpm and at an exhaust gas temperature of 950° C. for 50 hours. By this test, a favorable results was obtained, i.e., no cracks or breakage and no movements at the joining portions were found.

Figure 6:
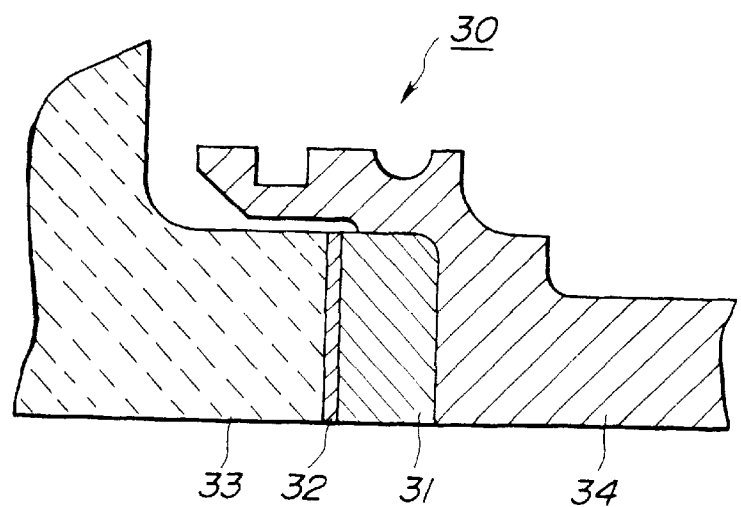

FIG. 6 shows a ceramic-metal composite rotor 30 according to a further embodiment though its lower half is omitted for convenience of illustration. This embodiment differs from the previous embodiment of FIG. 5 in the material forming the intermediate member 31. The intermediate member 31 is made of a super hard alloy which has a litter smaller thermal expansion efficiency than W alloy. The intermediate member 31 is joined to the turbine wheel 33 by way of the Ni plate whilst being press fitted in the metallic member 34.

Accordingly, this embodiment can produce substantially the same effect with the previous embodiment of FIG. 5.

Figure 7:
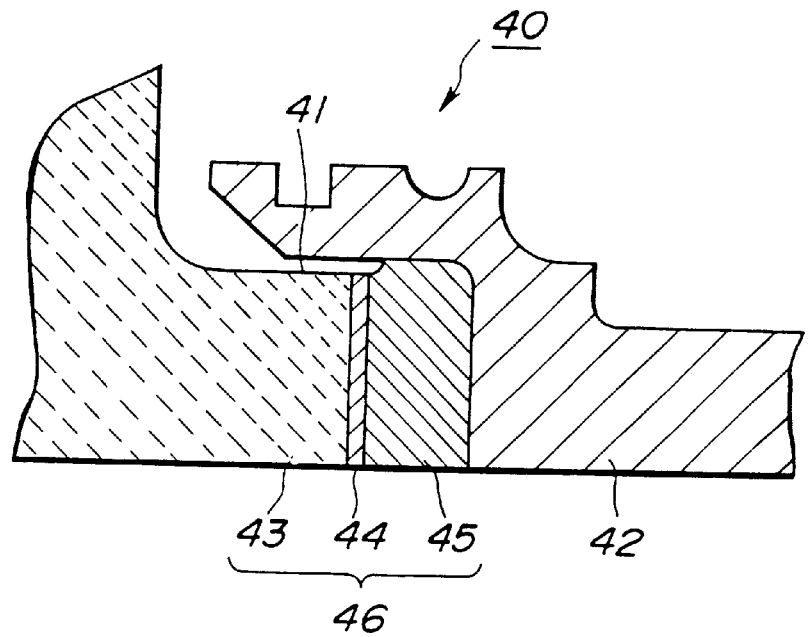

FIG. 7 shows a ceramic-metal composite rotor 40 according to a further embodiment. The turbocharger rotor 40 differs from the previous embodiment of FIG. 6 in that an annular recess 41 is not provided to the metallic member 42 but to the subassembly 46 made up of a turbine wheel 43, Ni plate 44 and an intermediate member 45.

This embodiment can produce substantially the same effect to the previous embodiments of FIGS. 5 and 6.

Figure 8:
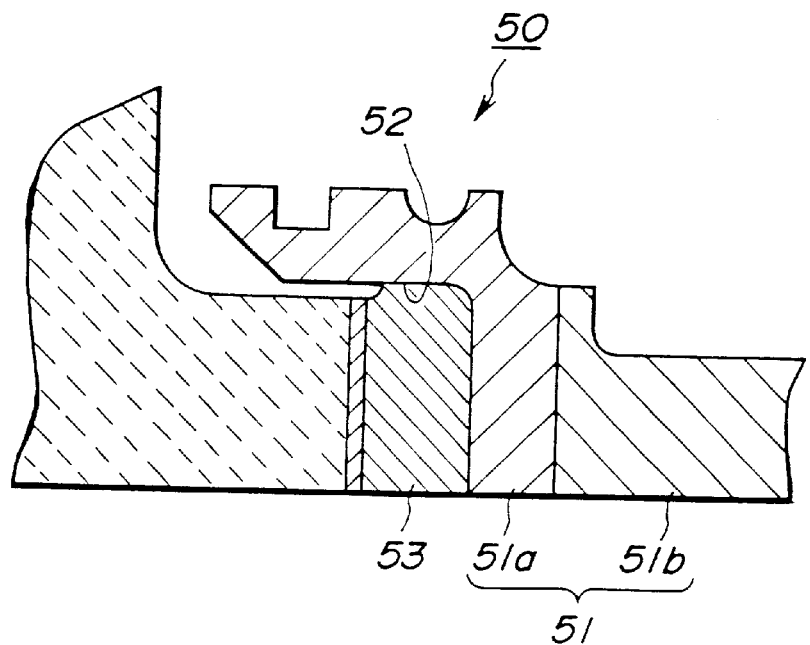

FIG. 8 shows a ceramic-metal composite rotor 50 according to a further embodiment. This embodiment is substantially similar to the previous embodiment of FIG. 7 except that the metallic member 51 consists of a socket portion 51a formed with a socket recess 52 and made of Incoloy 903 and a shaft portion 51b made of alloy steel (JIS-SNCM439).

To obtain the metallic member 51, the socket portion 51a is first joined to the shaft portion 51b by friction welding and then aged by heating at a temperature of 720° C. for 8 hours and at a temperature of 620° C. for 8 hours. Thereafter, the shaft portion 51b is hardened by high-frequency induction hardening. Finally, the socket portion 51a is finished to complete the metallic member 51.

This structure enables usage of the rotor 50 at a higher temperature than the previous embodiment of FIG. 7 since the difference in thermal expansion efficiency between the intermediate member 53 and metallic member 51 is small. Except for this, this embodiment can produce substantially the same effect to the previous embodiment of FIG. 7.

Figure 9:
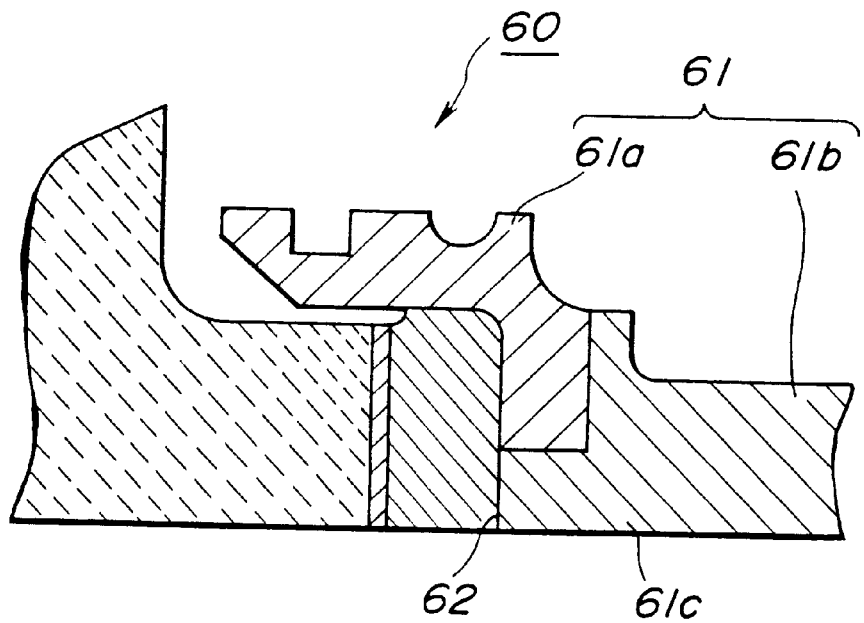

FIG. 9 shows a ceramic-metal composite rotor 60 according to a further embodiment of the present invention. This embodiment is substantially similar to the previous embodiment of FIG. 8 except that the metallic member 61 consists of a socket portion 61a formed with a socket recess 62 and made of Incoloy 903 and a shaft portion 61b made of alloy steel (JIS-SNCM439), which socket portion 61a and shaft portion 61b are joined together by electron beam welding. The shaft portion 61b has an end extending through the socket portion 61a to partially define the bottom of the socket recess 62.

This embodiment can produce substantially the same effect to the previous embodiment of FIG. 8.

Figure 10:
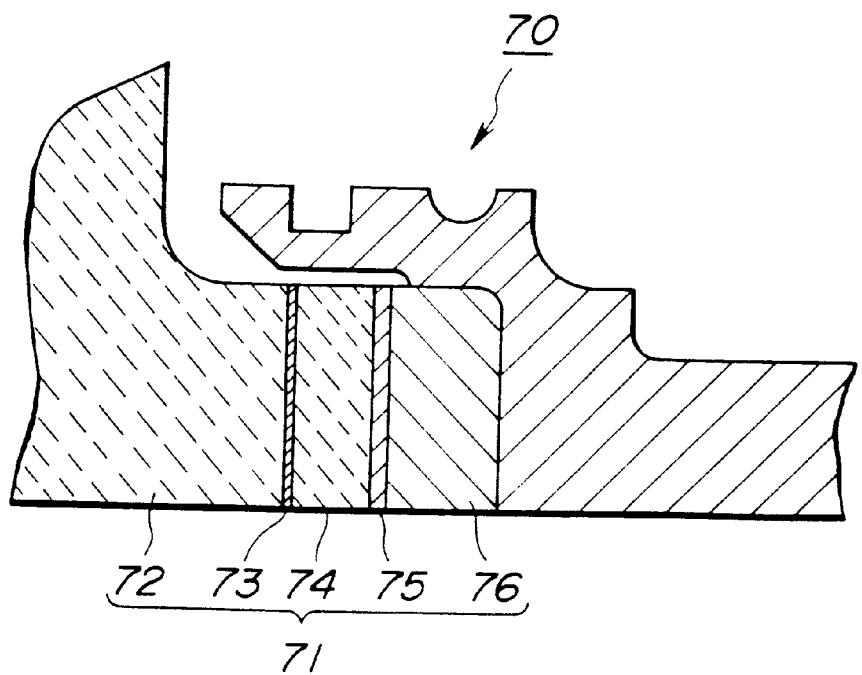

FIG. 10 shows a ceramic-metal composite rotor 70 according to a further embodiment. This embodiment is substantially similar to the previous embodiment of FIG. 5 except that the subassembly 71 consists of a turbine wheel 72 made of silicon nitride, Ni plate 73, a composite material plate made of Si3N4-30TiN and an intermediate member 76 made of W alloy.

This embodiment makes it possible to use the rotor 70 at a higher temperature than the previous embodiment of FIG. 5 since the composite material plate 74 has a thermal expansion efficiency between those of the silicon nitride and W alloy.

What is claimed is:

1. A ceramic-metal composite assembly comprising:
   (A) a ceramic member;
   (B) a metallic member; and
   (C) an intermediate member made of a material having a thermal expansion efficiency between those of the materials forming said ceramic member and said metallic member;
   said intermediate member being metallurgically joined to said ceramic member whilst being mechanically joined to said metallic member.

2. A ceramic-metal composite assembly comprising:
   (A) a ceramic member;
   (B) a metallic member;
   (C) an intermediate member made of a material having a thermal expansion efficiency between those of the materials forming said ceramic member and said metallic member;
   said intermediate member being joined to said ceramic member whilst being joined to said metallic member;
   (D) metallurgical joining means for joining said intermediate member to said ceramic member; and
   (E) mechanical joining means for joining said intermediate member to said metallic member.

3. A ceramic-metal composite assembly according to claim 2, wherein said metallurgical joining means comprises brazing by the use of an active brazing metal selected from the group of metals consisting of Ag—Cu—Ti alloys, Cu—Ni—Ti alloys and Cu—Ti alloys.

4. A ceramic-metal composite assembly according to claim 2, wherein said metallurgical joining means comprises heating by the use of a mixture of ceramic materials selected from the group consisting of $Al_2O_3$, $TiO_2$ and $SiO_2$.

5. A ceramic-metal composite assembly according to claim 2, wherein said metallurgical joining means comprises hot pressing by interposing between said intermediate member and said ceramic member a metal selected from the group of metals consisting of Fe—Ni—Cr alloys, Ni—Cr—Si alloys, Ni—Cr alloys and Nb.

6. A ceramic-metal composite assembly according to claim 2, wherein said mechanical joining means comprises press fitting.

7. A ceramic-metal composite assembly according to claim 2, wherein said mechanical joining means comprises shrinkage fitting.

8. A ceramic-metal composite assembly according to claim 2, wherein said material forming said intermediate member is selected from the group of metals and ceramics consisting of W alloys, super hard alloys, $Si_3N_4$-Ti composite material and Incoloy 903.

9. A ceramic-metal composite assembly as claimed in claim 2, wherein said mechanical joining means (E) is selected from the group consisting of press fitting, shrink fitting and fastening with bolts or screws.

10. A ceramic-metal composite assembly as claimed in claim 2, wherein said ceramic member (A) is made of a ceramic material selected from silicon nitride and alumina.

11. A ceramic-metal composite assembly as claimed in claim 2, wherein said metallic member (B) is made of a material selected from the group consisting of alloy steel, heat resisting steel, stainless steel and Incoloy 903.

12. A ceramic-metal composite assembly as claimed in claim 2, wherein said intermediate member (C) is made of a material selected from the group consisting of tungsten alloy, super hard alloy, silicon nitride-TiN and Incoloy 903.

13. A ceramic-metal composite assembly comprising:

(A) a shaft member made of a ceramic material;

(B) an intermediate member made of a metallic material and joined to an end of said shaft member by metallurgical joining means; and (C) a hollow cylindrical member made of a metallic material, fitted on said intermediate member and joined to said intermediate member by means of mechanical joining means;

wherein said metallic material forming said intermediate member has a thermal expansion efficiency between those of the materials forming said shaft member and said hollow cylindrical member.

14. A ceramic-metal composite assembly according to claim 13, wherein said shaft member is made of a material consisting of $Si_3N_4$, said hollow cylindrical member is made of heat resisting steel, and said intermediate member is made of Incoloy 903.

15. A ceramic-metal composite assembly according to claim 14, wherein said metallurgical joining means comprises heating said shaft member and said intermediate member in a vacuum while interposing therebetween an intermediate layer consisting of foils of Ti and Cu and a sheet of Ni.

16. A ceramic-metal composite assembly according to claim 15, wherein said mechanical joining means comprises press fitting.

* * * * *